No. 787,975. PATENTED APR. 25, 1905.
F. C. EDELEN.
COMBINED HOUSE TRAP AND CELLAR DRAIN.
APPLICATION FILED JUNE 25, 1904.
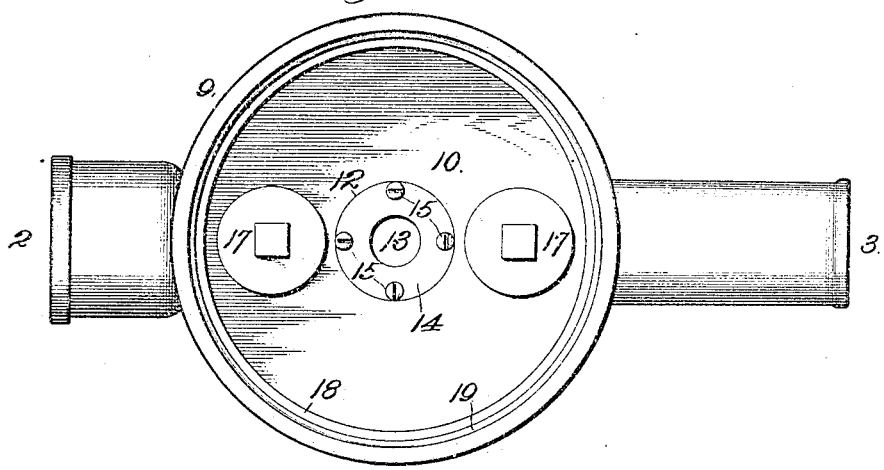
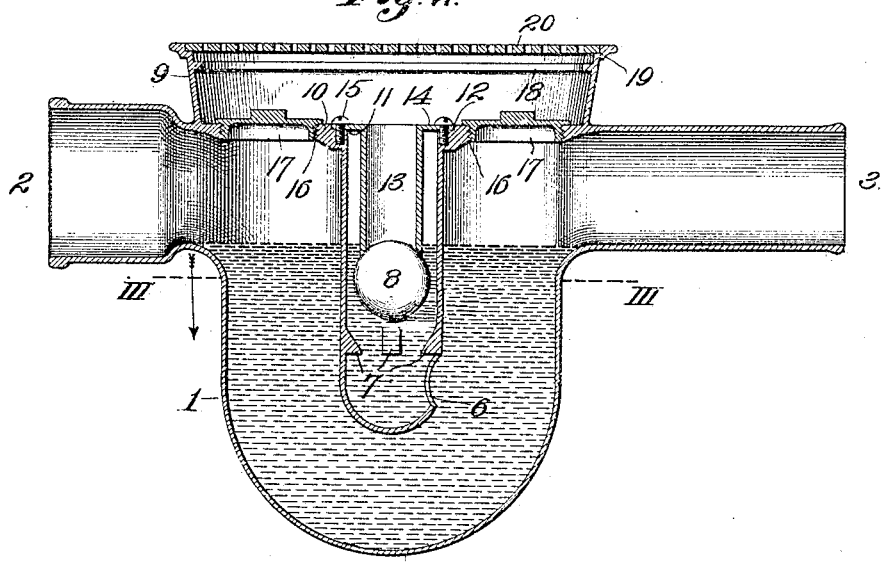
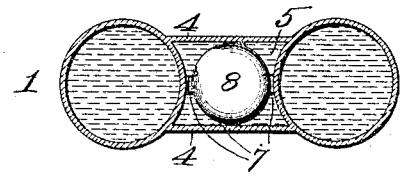
Witnesses
J. R. Glow
H. C. Rodgers
Inventor
Frederick C. Edelen
By George J. Thorpe
Atty.

No. 787,975

Patented April 25, 1905

UNITED STATES PATENT OFFICE.

FREDERICK C. EDELEN, OF KANSAS CITY, MISSOURI.

COMBINED HOUSE-TRAP AND CELLAR-DRAIN.

SPECIFICATION forming part of Letters Patent No. 787,975, dated April 25, 1905.

Application filed June 25, 1904. Serial No. 214,126.

*To all whom it may concern:*

Be it known that I, FREDERICK C. EDELEN, a citizen of the United States, residing at Kansas City, in the county of Jackson and State of Missouri, have invented certain new and useful Improvements in a Combined House-Trap and Cellar-Drain, of which the following is a specification.

This invention relates to combined house-traps and cellar-drains; and my object is to produce a device of this character which will be charged with fresh water each time a house fixture is used and which is provided in the bottom of the drain-pan chamber with a trap-screw registering with each leg of the trap to permit the latter and the contiguous parts of the pipe to be easily and quickly cleared of all obstructions.

With this object in view the invention consists in certain novel and peculiar features of construction and organization, as hereinafter described and claimed, and in order that it may be fully understood reference is to be had to the accompanying drawings, in which—

Figure 1 is a top plan view of a combined house-trap and cellar-drain with the drain-pan grate removed. Fig. 2 is a central vertical longitudinal section of the house-trap and cellar-drain complete. Fig. 3 is a horizontal section on the line III III of Fig. 2.

In the said drawings, 1 designates a trap of the usual U form and provided at the upper end of one leg with a pipe extension 2 for connection with the house-pipe and at the upper end of the other leg with a pipe 3 for connection with the sewer, the legs of the trap being connected together by walls 4, so as to provide a chamber 5, and the lower end of said chamber communicates with the leg of the trap, connected directly to the sewer, through the opening 6, and projecting inwardly of chamber 5 above opening 6 are lugs 7 to limit the downward movement in said chamber of the float-ball 8 without closing the chamber to the passage of water.

9 designates a drain-pan cast integral with the trap by preference, so that its bottom 10 shall form a closure for the upper end of the trap, and said drain-pan bottom is provided with a central hole 11 and a registering recess 12, a tube 13 depending through said hole into chamber 5 to a plane slightly below that of the pipes 2 and 3 and having an outwardly-projecting flange 14 fitting and secured in said recess 12 by screw-bolts 15, the arrangement being such that the water entering the pan must escape by way of tube 13.

At opposite sides of tube 13 the pan-bottom is provided with threaded holes 16, normally closed by trap-screws 17 of the usual or any preferred type, and the pan is provided internally with a flange 18 and with the usual seat 19 for the perforated grate 20.

The trap when water is not passing through it stands charged with water to about the depth shown, and the float-ball is held by the water tightly against the bottom of tube 13, in which position it remains whenever water is passing only through the trap, the same entering by way of pipe 2 and escaping by way of pipe 3, and owing to the frequency with which the house-fixtures are used it is obvious that no time is given for the water to evaporate from the trap, and thus cause the unseating of the valve and give an opportunity for offensive odors to pass up through the drain-pan. Water entering the trap by way of the drain-pan forces the ball from its seat at the lower end of tube 13 and displaces an equal volume of water from the trap, this water passing off through pipe 3 to the sewer, the ball being reseated immediately the surplus water is disposed of. It will thus be seen that there is a change of water in the trap each time the charge comes through the drain-pan as well as with each charge from the house-fixtures.

An obstruction in the trap can be easily and quickly removed by simply raising the drain-pan grate and removing the trap-screws or that one nearest the obstruction. An obstruction to the passage of water through the drain-pan is equally accessible, as it may be reached through the trap-screw opening nearest opening 6 through tube 13, or said tube and the ball can be easily and quickly removed.

Should conditions be such that it would be desirable to deepen the drain-pan, it can be accomplished by placing a cylinder (not shown) of proper length on flange 18, and closing the upper end of said cylinder with the grate 20.

From the above description it will be apparent that I have produced a combined house-trap and cellar-drain which embodies the features of advantage enumerated as desirable in the statement of the object of the invention and which, furthermore, is of simple, strong, durable, and cheap construction, and while I have illustrated and described the preferred embodiment of the same it is obviously susceptible of modification in minor particulars without departing from its principle and scope or sacrificing any of its advantages.

Having thus described the invention, what I claim as new, and desire to secure by Letters Patent, is—

1. A combined house-trap and cellar-drain, comprising a trap of substantially U form with one leg provided with an opening, a chamber between said legs and communicating with said opening, lugs projecting inwardly of said chamber above said opening, a drain-pan, a tube depending from the drain-pan into said chamber and establishing communication between them, and a float-valve in said chamber between the lower end of the tube and said lugs.

2. A combined house-trap and cellar-drain, comprising a trap of substantially U form with one leg provided with an opening, a chamber between said legs and communicating with said opening, lugs projecting inwardly of said chamber above said opening, a drain-pan, a tube depending from the drain-pan into said chamber and establishing communication between them, a float-valve in said chamber between the lower end of the tube and said lugs, and one or more trap-screws controlling communication between the drain-pan and the trap.

3. A combined house-trap and cellar-drain, comprising a trap of substantially U form with one leg provided with an opening, a chamber between said legs and communicating with said opening, lugs projecting inwardly of said chamber above said opening, a drain-pan having an opening communicating with said chamber, a tube depending from the drain-pan into said chamber and establishing communication between them, and provided with an outwardly-projecting flange closing the upper end of said chamber and resting on the bottom of the drain-pan and detachably secured thereto, and a float-valve in said chamber and between the lower end of the tube and said lugs.

4. A combined house-trap and cellar-drain, comprising a substantially U-form trap having a chamber formed between its legs and communicating at its lower end with one of said legs, a supply-pipe communicating with the upper end of one leg and a discharge-pipe communicating with the upper end of the other leg, a drain-pan above the trap and provided with a grate, openings in its bottom registering with the trap and an opening registering with said chamber, trap-screws normally closing the first-named openings, a tube depending through the other opening into said chamber and provided with an outwardly-projecting flange secured to the bottom of the pan and closing the upper end of said chamber, and a float-valve normally held by the pressure of the water in the trap and chamber against the lower end of said tube.

5. A combined house-trap and cellar-drain, comprising a trap of substantially U form, a chamber communicating with said trap, a drain-pan above the trap, having a grate and provided with one or more openings communicating with the trap, and an opening communicating with the chamber, one or more trap-screws controlling the first-named opening or openings, a tube depending through the other opening into the said chamber, a valve to close the lower end of said tube, and means to prevent the valve from closing communication between the chamber and the trap.

In testimony whereof I affix my signature in the presence of two witnesses.

FREDERICK C. EDELEN.

Witnesses:
  Jos. J. Magill,
  G. Y. Thorpe.